United States Patent [19]

Billings

[11] Patent No.: US 6,223,466 B1
[45] Date of Patent: May 1, 2001

[54] PLANTING SYSTEM

[76] Inventor: Daniel T. Billings, 9825 S. Homan Ave., Evergreen Park, IL (US) 60805

[*] Notice: Subject to any disclaimer, the term of this patent is extended or adjusted under 35 U.S.C. 154(b) by 0 days.

[21] Appl. No.: 09/415,438

[22] Filed: Oct. 8, 1999

Related U.S. Application Data

[62] Division of application No. 09/015,094, filed on Jan. 29, 1998, now abandoned.

[51] Int. Cl.$^7$ ................................................. A01G 25/00
[52] U.S. Cl. ................................................. 47/79; 47/75
[58] Field of Search .......................... 47/48.5, 59, 65.5, 47/66.1, 66.6, 66.7, 71, 73, 75, 78, 79, 81; D11/152; 248/523; 252/83, 234

[56] References Cited

U.S. PATENT DOCUMENTS

| | | |
|---|---|---|
| 1,421,327 * | 6/1922 | Waters .................................. 47/47.1 |
| 1,897,520 | 2/1933 | Kimber . |
| 2,072,774 | 3/1937 | Schoepflin . |
| 2,099,329 | 11/1937 | Comstock et al. . |
| 2,140,862 | 12/1938 | Sumner . |
| 2,344,794 | 3/1944 | Vallinos . |
| 2,387,340 | 10/1945 | Moriarty . |
| 2,436,631 | 2/1948 | Cohn . |
| 2,496,758 | 2/1950 | Tingley . |
| 2,514,269 | 7/1950 | Wilberschied . |
| 2,610,443 | 9/1952 | Carlson . |
| 2,710,491 | 6/1955 | Carlson . |
| 2,741,875 | 4/1956 | Van Staalduinen . |
| 2,810,235 * | 10/1957 | Magid ..................................... 47/81 |
| 2,810,990 | 10/1957 | Wright . |
| 3,302,326 | 2/1967 | Maino . |
| 3,309,814 | 3/1967 | Langley . |
| 3,362,105 | 1/1968 | Steiger . |
| 3,369,321 * | 2/1968 | Blackistone ............................ 47/47.1 |
| 3,682,347 | 8/1972 | Barrier . |
| 3,867,789 | 2/1975 | Jacobsen . |
| 4,142,324 * | 3/1979 | Magyar .................................... 47/75 |
| 4,242,835 | 1/1981 | Sorribes . |
| 5,042,197 | 8/1991 | Pope . |
| 5,103,587 * | 4/1992 | Holler ...................................... 47/75 |
| 5,125,184 * | 6/1992 | Anderson ................................ 47/81 |
| 5,222,326 * | 6/1993 | Higgins .................................... 47/73 |
| 5,322,254 | 6/1994 | Birkmeier . |
| 5,649,386 | 7/1997 | Rynberk . |

FOREIGN PATENT DOCUMENTS

| | | | |
|---|---|---|---|
| 464595 | 12/1968 | (CH) ..................................... 47/66.1 |
| 1482977 | 6/1969 | (DE) ........................................ 47/75 |
| 3740100 * | 6/1989 | (DE) ........................................ 47/81 |
| 2123664 | 2/1984 | (GB) ........................................ 47/75 |
| 1508997 | 9/1989 | (SU) ..................................... 47/66.1 |
| WO 96/39801 * | 12/1996 | (WO) ...................................... 47/79 |

* cited by examiner

Primary Examiner—Charles T. Jordan
Assistant Examiner—Francis T. Palo
(74) Attorney, Agent, or Firm—Brinks Hofer Gilson & Lione

(57) ABSTRACT

A planting system comprising two containers, an inner container and a complementary outer container. The outer container is placed permanently into the ground or in any desired location. The inner container is then placed into the outer container. Thereafter, the inner container can be placed into and removed from the outer container whenever desired. Flowers, plants and the like are planted into the inner container either before or after the inner container is placed into the outer container. In this manner, flowers and plants can easily be planted into inner containers while the gardener is sitting, standing or in any other comfortable position. The gardener may then easily place and replace any desired inner container into any desired complementary outer container. In addition, flowers and plants can easily be interchanged from one location to another location by replacing one inner container which contains one flower or plant from a outer container with another similar inner container which contains another flower or plant.

31 Claims, 8 Drawing Sheets

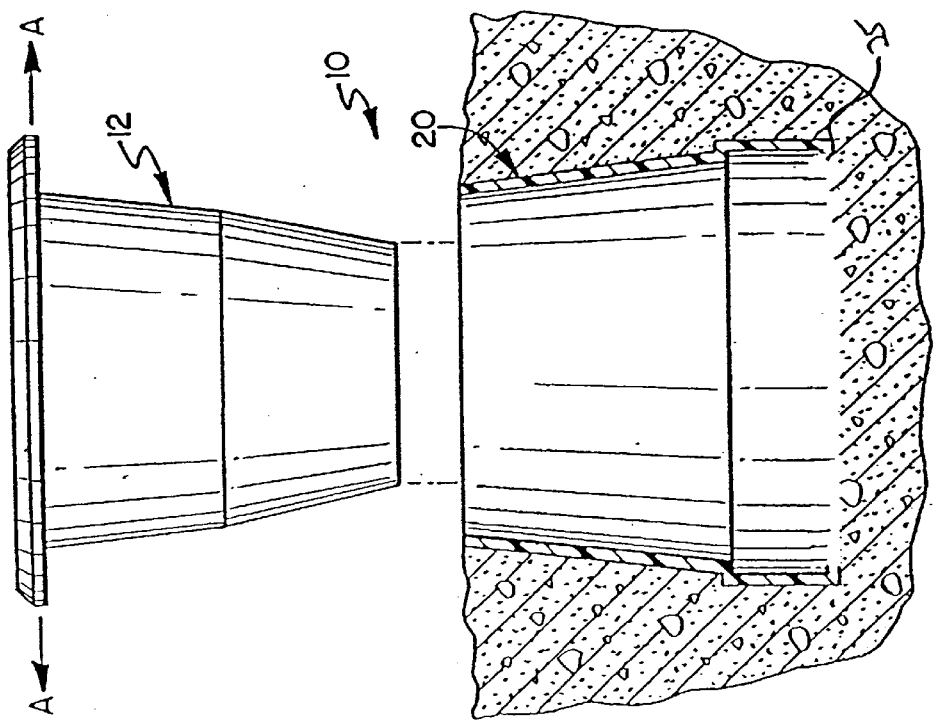
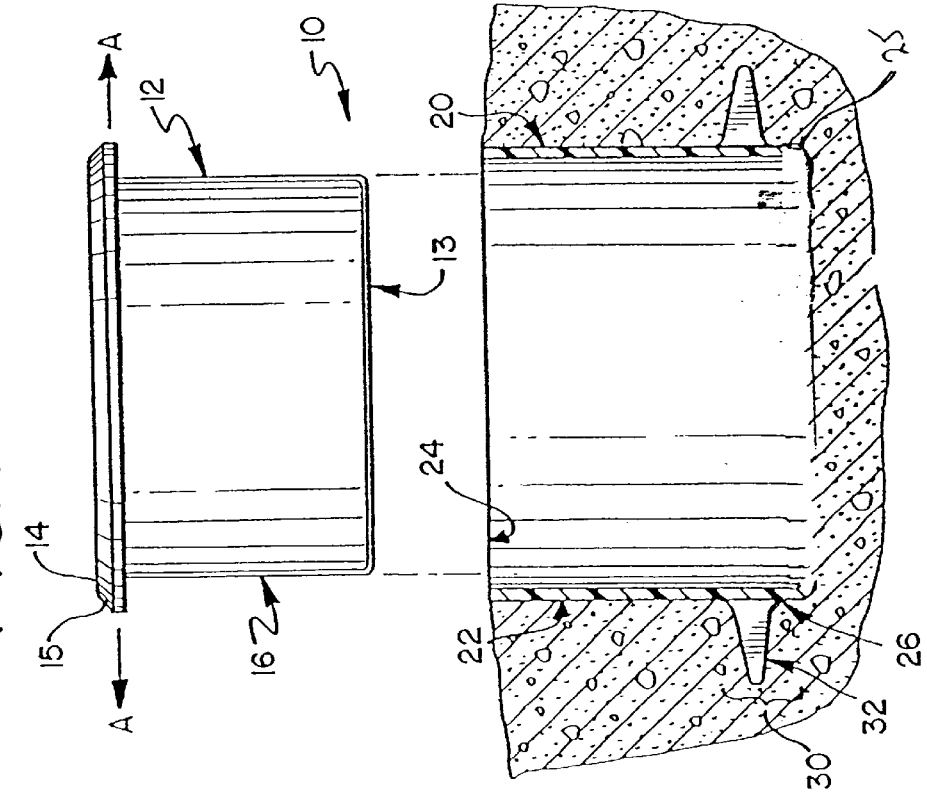

PLANTING SYSTEM

This application is a division of application Ser. No. 09/015,094, filed Jan. 29, 1998, abandoned.

BACKGROUND OF THE INVENTION

This invention relates to a planting system. More particularly, the present invention relates to a system of containers to plant flowers, plants and the like wherein different flowers and plants can be planted in different containers and can be interchanged when desired.

People like to beautify their homes and yards. One way to beautify one's surroundings is to plant flowers, plants and the like. However, planting and gardening may be difficult for some people because of physical limitations or a lack of time.

Presently, when a gardener wants to plant a flower or plant in a particular location in his yard, he must physically plant the flower or plant into the ground at that location. This generally means, to plant some flowers for example, that the gardener must kneel for a period of time, first digging a hole for the flowers, then placing the flowers into the hole, treating and replacing the soil around the flowers, and compacting the soil.

Additionally, the gardener must plant his plants and flowers one at a time around his yard. Again, planting a flower or plant may take a significant amount of time and effort, as described. If the gardener desires many different flowers or plants planted around his yard, he would have to spend many hours performing all of this planting. Then, if the gardener wishes to remove a plant or flower from one location and place it in another location, he must physically dig up the plant from its original location and then dig a new hole at the new location and replant the plant or flower.

In the alternative, the gardener may plant plants and flowers into flower pots, which are conventional and well known in the art, and place these pots around his or her yard in desired locations. However, these plants and flowers are not planted into the ground. In addition, placing pots onto the lawn causes the grass underneath the pot to turn brown and possibly die. Thus, flower pots may generally only be placed on concrete or asphalt areas, such as sidewalks, driveways or decks, or some other surface other than the grass. This limits the placement of the flowers or plants.

Accordingly, it would be desirable to provide a planting system that allows gardeners to plant flowers and plants without needing to physically kneel on the ground for long periods of time, allows gardeners to plant many flowers and plants in less time than conventional pots and containers, and allows gardeners flexibility in placement in his or her yard.

SUMMARY OF THE INVENTION

The present invention is directed to a planting system. Generally, the planting system comprises two containers: a first, inner container and a second, outer container. The inner container and the outer container may be made in a variety of shapes, designs and sizes, such as, for example, cylindrical, frustoconical, rectangular, square and triangular. The inner container is made to be slightly smaller than the outer container, such that the inner container fits snugly into the outer container.

During use, the outer container may be planted permanently into the ground. The outer container of the present invention is, however, not limited to being permanently planted into the ground. The outer container may be a window box or the like, or it may be placed above ground in any desired location. After the outer container is positioned, the inner container is placed into the outer container. Flowers, plants or the like are contained in the inner container and may be planted either before or after the inner container is placed into the outer container.

One object of the present invention is to address the need of those persons who like to garden but cannot physically kneel for long periods of time to plant flowers or plants into the ground. With the present invention, the only physical planting into the ground that the gardener needs to perform is to plant an outer container one time for any one location. He then plants flowers or plants into an inner container while sitting on the ground, sitting at a table or in any other comfortable position. Then, he simply places the inner container into the outer container, which is already planted into the ground.

Another object of the present invention is to address the needs of those persons who like to garden but who lack time to perform significant landscape work in their yard. With the present invention, various outer containers may be planted into the ground at different locations around the gardener's yard, and the gardener then need only plant the desired flowers or plants into corresponding inner containers and place the inner containers into the outer containers. Planting flowers or plants into the inner containers takes less time than planting them into the ground, because the gardener does not have to dig into the ground.

An advantage of the present planting system is that it allows the gardener to interchange one flower or plant with another without physically digging up the flower or plant from the ground. It is envisioned that the gardener may have many different outer containers and many different inner containers available for use in performing landscape work in his or her yard. As stated above, the inner containers and the outer containers may be formed in a variety of shapes. For a particular shape, however, a number of the inner containers can fit into a given outer container. Thus, the gardener may take a first inner container (with the original flowers or plants contained therein) out of a first outer container and place a second inner container (with different flowers or plants contained therein) into the first outer container. Similarly, the gardener can place the first inner container (with the original flowers or plants contained therein) into a second outer container which has a complementary shape and which is positioned at another location. Of course, a third inner container and a third outer container (and so on) may be used to allow even further variety in the placement options. With the present invention, by utilizing a number of different containers systems, plants and flowers may be rotated throughout the gardener's yard in an easy manner for variety and for a change in scenery. The placements of plants and flowers are only limited by the number of containers that the gardener has and his or her imagination.

Another object of the present invention is to address the need for protecting flowers and plants from flooding and freezing temperatures. With the present invention, the gardener need only remove the inner containers (with the plants or flowers contained therein) from the outer containers and place them in a place safe from the flooding or freezing temperatures.

Another advantage of one embodiment of the present invention is that the inner containers, as well as the outer containers, may be stacked together, or nested, in a vertical direction for easy storage and transport. In this embodiment, the inner containers and the outer containers have complementary shapes, with the inner containers being slightly smaller in diameter than the outer containers, but each are tapered from one end to the other. For this tapering, the diameters of the inner containers and the diameters of the outer containers may increase from bottom to top or, conversely, from top to bottom. Thus, the inner containers are tapered such that they fit into other inner containers and the outer containers are tapered to fit into other outer containers. Thus, the inner containers, as well as the outer containers, can be stacked together for easy storage and transport.

In one embodiment, the inner container has a horizontal lip protruding from its upper edge. This lip may be made aesthetically pleasing to the eye, e.g., by painting it in a faux finish of stone, marble, wood, brick and the like. The protruding decorative lip also functions as a handle to lift and lower the inner container relative to the outer container. In another embodiment, the lip can be designed to snap fit onto the top edge of the inner container for more secure placement.

In a preferred embodiment, the present invention includes an advantageous watering system. In particular, the inner container is closed at its bottom surface and contains a capillary unit positioned at its bottom. Water can accumulate at the bottom of the inner container to form a water reservoir. When the plant or flower is dry and requires watering, capillary action will cause water to travel from the water reservoir through the capillary unit into the soil where the plant or flower is potted. Thus, with the capillary unit, the gardener can perform less frequent manual waterings. In addition, the capillary unit keeps water from being dispensed into the ground from the inner container, thereby also allowing the water to remain in the inner container to allow for the above-described capillary action and thus further allowing for less frequent manual waterings.

In another embodiment, the outer container includes an anchoring system. The anchoring system comprises slots located in the side wall of the outer container and anchors that are placed through those slots into the surrounding soil to anchor the outer container into the ground.

While the inner containers and the outer containers may be fabricated of many different materials, if the outer container is to be placed in the ground, the outer container can be made of material which is sufficiently durable to be placed into the ground year-round and is not biodegradable.

The present invention is directed to perennial, annual and biennial plants and flowers, as well as any other suitable plants. Perennial plants or flowers are those which can grow for many growing seasons. They bloom only once a year for a short period of time, usually a few weeks, during the spring, summer or fall, depending on the type of perennial. After the blooms fade, the green foliage of the plant or flower remains for the remainder of the year.

The present invention allows the gardener to move his or her perennials to take advantage of those perennials which are currently in bloom. Thus, for example, when a perennial loses its bloom, the inner container in which this perennial is planted may be removed from the outer container in which it was placed and replaced by a second inner container. A perennial which is blooming or about to bloom can be planted into the second inner container before or after this inner container is placed into the outer container. The perennial which lost its bloom (which is in the first inner container) can then be placed in a different location in the yard in another outer container for the remainder of the year. During the next growing season, the perennial in the first inner container may be replaced into the first outer container when it is in bloom. In this manner, perennials may be rotated throughout different locations in a gardener's yard to take advantage of those perennials currently in bloom.

Annuals are those plants or flowers which may grow for only one growing season. They generally bloom throughout the entire growing season. Biennials are those which grow for two growing seasons. Similar to perennials, the present invention allows the gardener to place and replace his annuals and biennials around his or her yard. For example, one annual may be planted in a first inner container, which itself has been placed into a first outer container. At any time thereafter, the first inner container may be removed from the outer container and placed into another outer container. In addition, a second annual may be planted in a second inner container, which itself has been placed into a second outer container. At any time thereafter, the second inner container may replace the first inner container or may be placed into other outer containers. The interchangeability of annual plants or flowers is thus only limited by the number of containers a gardener has and his or her imagination.

These and other objects, advantages, and features of the present invention will be better understood upon review of the following detailed description of the preferred embodiments.

BRIEF DESCRIPTION OF THE DRAWINGS

FIG. 1 illustrates one embodiment of the present invention;

FIG. 2 illustrates another embodiment of the present invention;

DETAILED DESCRIPTION OF THE PREFERRED EMBODIMENTS

Figure 3A:
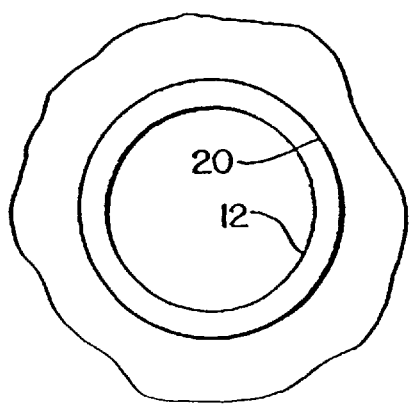
FIGS. 3A through 3E depict plan views of a variety of shapes that the present invention may take.
Figure 3B:
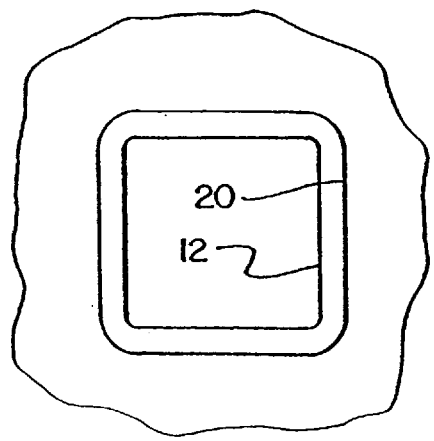
Figure 3C:
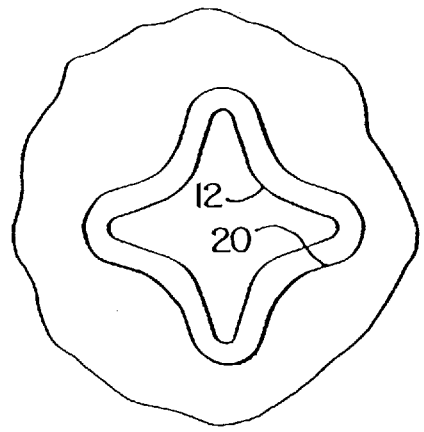
Figure 3D:
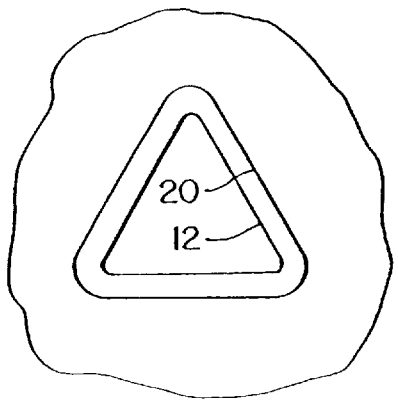
Figure 3E:
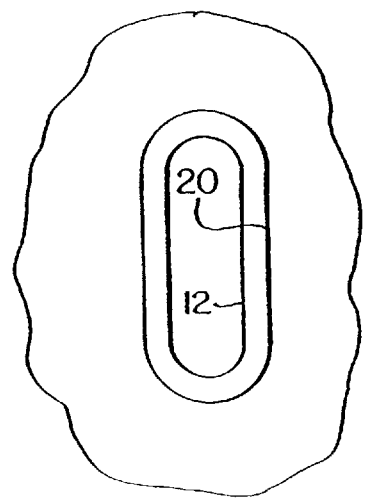

FIG. 1 depicts one embodiment of the planting system 10. Generally, the planting system 10 includes two containers:

an inner container 12 and an outer container 20. The inner container 12 has a bottom wall 13 and at least one side wall 16. The outer container has at least one side wall 22 and is preferably open at the bottom. The inner container 12 and the outer container 20 are shaped such that the inner container 12 can be removably placed within the outer container 20. During use, the outer container 20 may be planted permanently into the ground. Alternatively, the outer container 20 may comprise a window box, or may be placed above ground where desired by the gardener.

The outer container 20 may be placed into the ground in the following manner. First, soil is removed to form a hole in the ground. Second, the outer container 20 is placed into the hole such that the top edge 24 of the outer container 20 is generally flush with the top of the surrounding soil, or mulch or stones, depending on where the outer container 20 is planted. Next, soil is replaced around the outside of the wall 22 of the outer container 20. In one embodiment, the system 10 includes an anchoring apparatus 30, which is explained in further detail below. In that embodiment, once soil is placed around the outside of the wall 22 of the outer container 20, anchors 32 are inserted through anchor slots 26 which are formed in the wall 22 of the outer container 20. Soil may then replaced at the bottom of the outer container 20 if desired, at or near the bottom edge 25 of the outer container 20.

Once the outer container is positioned, the inner container 12 is placed into the outer container 20. Flowers, plants or the like are planted into the inner container 12 either before or after the inner container 12 is placed into the outer container 20. Once the inner container 12 is positioned within the outer container 20, soil may be compacted around the top edge 14 of the inner container 12 to ensure that the system 10 is firmly planted into the ground.

At any time thereafter, the flowers or plants in the inner container 12 may be replaced by new flowers or plants in an easy manner. In one case, the old flowers or plants are removed before removing the inner container 12 from the outer container 20. The inner container 12 is then removed front the outer container 20, new flowers or plants are planted in the inner container 12, and the inner container 12 is replaced into the outer container 20. In another case, the inner container 12 is removed from the outer container 20, the old flowers or plants are replaced with new flowers or plants, and then the inner container 12 is replaced into the outer container 20. In yet another case, the old flowers or plants may be removed from the inner container 12 and replaced with new flowers or plants without removing the inner container 12 from the outer container 20.

The inner container 12 and the outer container 20 can be formed in any number of shapes and sizes. In the embodiment illustrated in FIG. 1, the inner container 12 and the outer container 20 are cylindrical in shape. In another embodiment, illustrated in FIG. 2, the inner container 12 and the outer container 20 are generally frustoconical in shape. More particularly, in the embodiment shown in FIG. 2, the diameters of the inner container 12 and the outer container 20 generally increase from one end of the container to the other. For the inner container 12, its diameter increases in the direction from bottom to top. For the outer container 20, its diameter increases in the direction from top to bottom. In this embodiment, the anchoring apparatus 30 does not need to be utilized. This is because the weight of the soil bearing down on the tapered outer container 20 will tend to keep the outer container 20 in position. However, if the outer container 20 of this embodiment does shift, soil may be removed from inside and under the outer container 20 to allow the outer container 20 to be repositioned in the soil.

FIGS. 3A through 3E illustrate other shapes, including quare, oval and triangular, that the present invention may take. It should be understood that the present invention is not limited to these shapes but may take any other shape desired. The view of FIGS. 3A through 3E are plan views of the system 10 planted in or placed on the ground. In these embodiments, the outer container 20 has a predetermined cross-sectional shape. The shape of the inner container 12 is then complementary to the shape of the outer container 20 so that the inner container 12 may be removably placed in the outer container 20.

Figure 4:
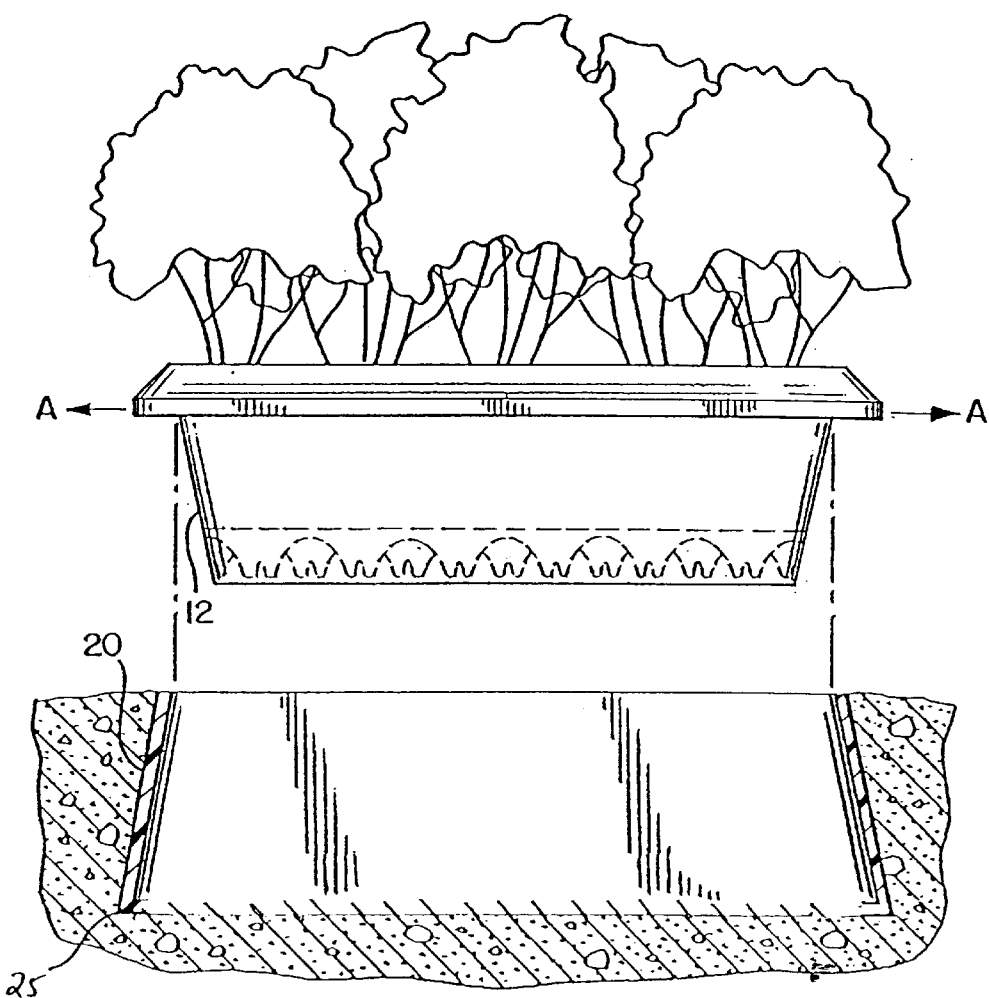
FIG. 4 illustrates a rectangular embodiment of the present invention.
Figure 5:
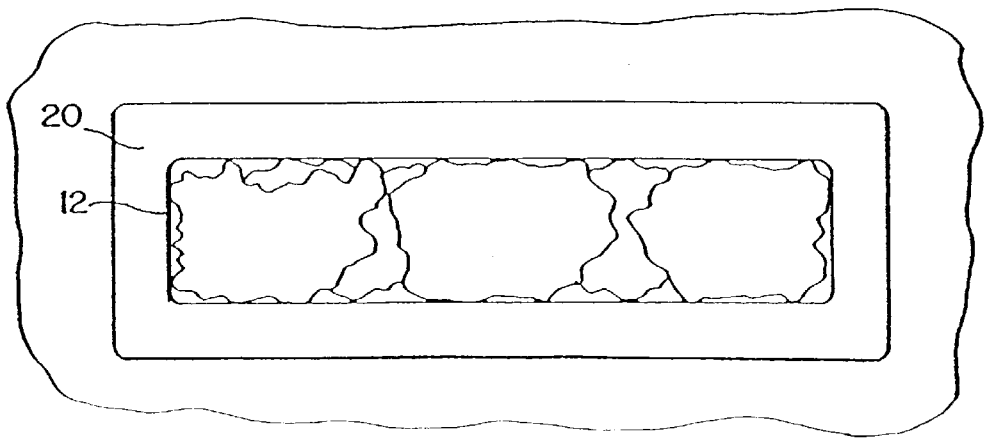
FIG. 5 is a plan view of the rectangular embodiment of the present invention illustrated in FIG. 4.

In another embodiment, illustrated in FIGS. 4 and 5, the inner container 12 and the outer container 20 are generally box-like in shape and have square or rectangular cross-sections. FIG. 5 shows a plan view of the embodiment with a rectangular cross-section. In this embodiment, the rectangular cross-sectional area of the inner container 12 may increase from bottom to top. Conversely, the rectangular cross-sectional area of the outer container 20 may increase from top to bottom. Thus, again, the inner container 12 can be removably placed within the outer container 20.

The inner container 12 and the outer container 20 of the present invention may be fabricated of any one of a variety of different materials. Generally, if it is to be planted in the ground, the outer container 20 should be comprised of a material which is sufficiently durable to withstand being planted permanently in the ground year-round. In a preferred embodiment, the inner container and the outer container are made of a plastic material. Preferably, the inner container and the outer container are an injection molded plastic, a blow molded plastic, a cold cast plastic or a styrene plastic. The inner container 12 may also be made of a different material than the outer container 20.

Figure 6:
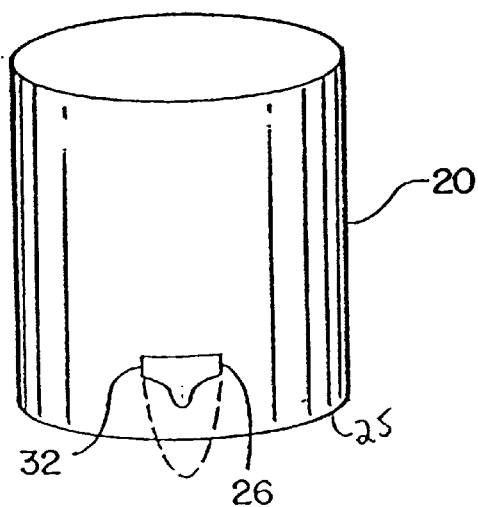
FIG. 6 illustrates an outer container with an anchor slot of one anchoring system that may be used in the present invention.

In one embodiment, the outer container 20 includes an anchoring system 30. FIG. 1 illustrates an embodiment which includes the anchoring system 30. The function of the anchoring system 30 is to anchor the outer container 20 into the ground. The anchoring system 30 includes a plurality of anchors 32, and a plurality of slots formed into the wall 22 of the outer container 20, which are called anchor slots 26. FIG. 6 shows an anchor slot 26 formed into the wall 22. The anchor slots 26 preferably are located near the bottom of the outer container 20.

Figure 7:
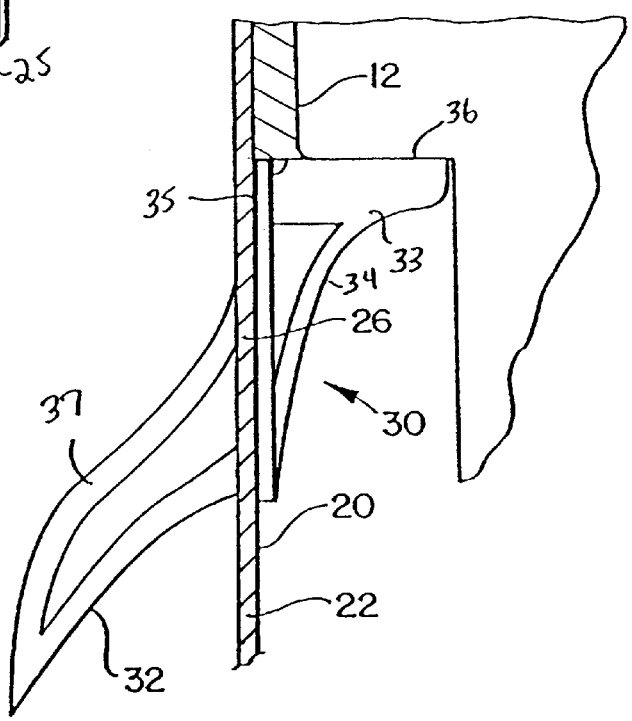
FIG. 7 is a side view of one portion of the anchoring system shown in FIG. 6.

The anchors 32 can be of any desired shape and size. FIG. 7 illustrates in an exploded side view an anchor 32, which has an upper section 33 and a lower section 37, which is inserted through an anchor slot 26 and into the surrounding soil to anchor the outer container into the soil. The upper section 33 is located inside the outer container 20, while the lower section 37 is located outside of the outer container 20. The lower section 37 is generally shaped like a fin. The upper section 33 is generally triangular in shape, with one side 34 of the upper section 33 being curved inward. The side 35 of the upper section 33 which contacts the wall 22 of the outer container 20 is larger than the anchor slot 26. The upper section 33 therefore cannot travel through the anchor slot 26. The top edge 36 of the upper section 33 is flat, which allows the inner container 12 to rest on the top edge 36 of the anchor 32.

In this embodiment, to anchor the outer container 20, the anchor 32 is inserted through the anchor slot 26 into the surrounding soil such that the lower section 37 is inserted through the anchor slot 26 until the upper section 33 contacts the inner surface of the wall 22 of the outer container 20. The anchors 32 are then held in place partly by the weight of the inner container 12 filled with soil and partly by the weight of the soil on the anchors 32 outside of the outer container 20. Because the anchors 32 are held in place, the outer container 20 is also held in place.

Figure 8:
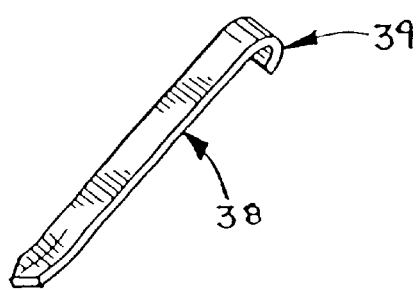
FIG. 8 illustrates another embodiment of an anchor that may be used in an anchoring system with the present invention.

FIG. 8 shows another embodiment of the anchor 32. In this embodiment, the anchor 32 is shaped like a tent stake, including a straight section 38 with a curved tip 39. Here, to place the anchor 32, the straight section 38 is inserted through the anchor slot 26 until the curved tip 39 contacts the inner surface of the wall 22 of the outer container 20. The weight of the soil outside of the outer container 20 on the anchors 32 holds the anchors 32 in place, and thus holds the outer container 20 in place.

The anchoring system 30 also allows the planting system 10 to be restored to its appropriate position if it has shifted for any reason. For example, the outer container 20 may be left in the ground throughout the winter season in colder climates when the ground freezes. As a result of the ground freezing, the outer container 20 may shift from the position in which the outer container 20 was originally planted. In the next growing season, to restore the outer container 20 to its appropriate position or a new desired position in the same location, the anchors 32 are first removed from the wall 22 of the outer container 20. Then, soil which is located inside the outer container 20 is removed. The outer container 20 may then be moved in a horizontal direction and/or a vertical direction to be repositioned into a desired position. Once repositioned, the anchors 32 may be reinserted through the wall 22 of the outer container to once again anchor the outer container 20 into the surrounding soil.

As illustrated in FIG. 1, the top edge 14 of the inner container 12 may be flattened out in the form of a flange to form a lip 15. The lip 15 is utilized as a handle to lift and lower the inner container 12 relative to the outer container 20. The lip 15 may also be aesthetically pleasing. The lip 15 may have any width, design, color, texture and the like. For example, the lip 15 may be painted or molded to look like wood, straw, stone, marble or any other desired decorative finish.

Figure 9:
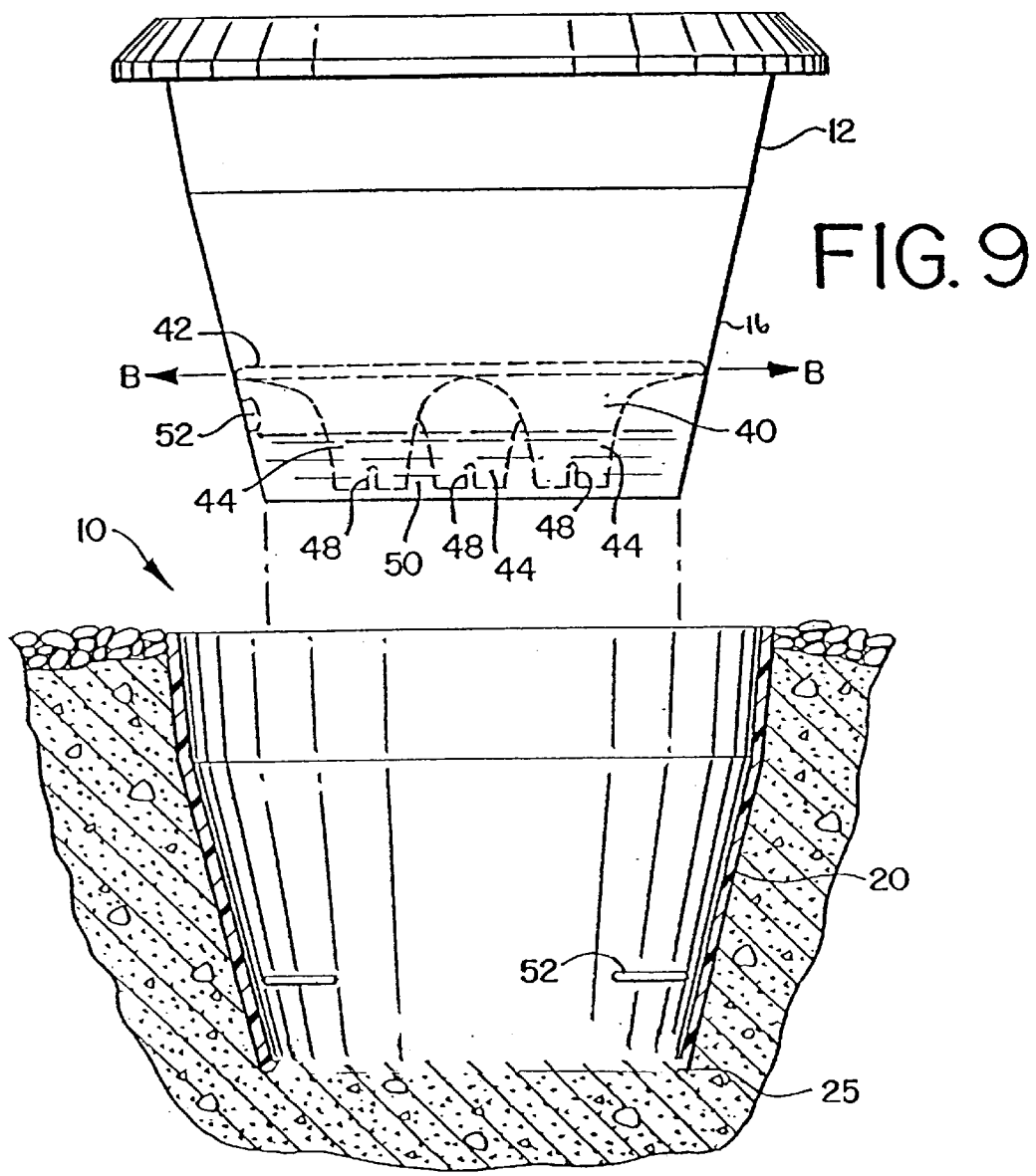
FIG. 9 illustrates a capillary unit that may be used with the present invention.
Figure 10:
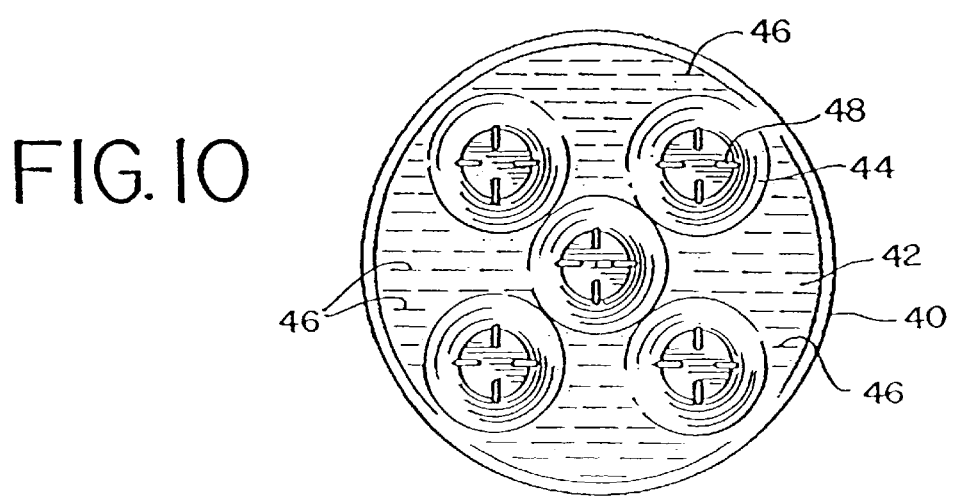
FIG. 10 is a plan view of the capillary unit illustrated in FIG. 9.

As illustrated in FIGS. 9 and 10, the planting system 10 may also include a capillary unit 40 to allow the flowers or plants which are planted into the inner container 12 to receive water and air. The capillary unit 40 is positioned at the bottom of the inner container 12. In one embodiment, the capillary unit 40 rests on the bottom of the inner container 12. In another embodiment, the capillary unit 40 snaps fit into the bottom of the inner container 12. The capillary unit 40 is comprised of an upper portion 42 which is complementary in shape to the cross-sectional shape of the inner container 12. For example, if the inner container 12 is cylindrical in shape and thus circular in cross-section, the upper portion 42 is circular. Or, if the inner container 12 is box-like in shape with a rectangular or square cross-section, then the upper portion 42 is rectangular or square, respectively.

A plurality of protrusions, or legs 44, protrude downwards from the upper portion 42 and rest on the bottom of the inner container 12. The legs 44 are hollow such that the soil in which the plant or flower is planted (in the inner container 12) falls into and is contained within the legs 44. A plurality of openings or slots 46 are formed into the upper portion 42 to allow water and air to travel through the upper portion 42. Other openings or slits 48 are formed at the bottom of the legs 44. These slits 48 allow water to travel by capillary action from a water reservoir 50 directly into the soil where the plant or flower is planted, as will now be explained.

During use of the planting system, water may accumulation the bottom of the inner container 12 to form the water reservoir 50. In particular, water will drain down through the soil through the slots 46 in the upper portion 42 and the slits 48 into the water reservoir 50. When the plant or flower needs water, capillary action will cause water from the water reservoir 50 to travel up through the slits 48 formed at the bottom of the legs 44 into the soil contained in the legs 44, which is part of the soil where the plant or flower is planted in the inner container 12.

In addition, an opening or slot 52 may be formed in the wall 16 of the inner container 12 below the upper portion 42. This slot 52 is used as a water reservoir overflow drain. Thus, if too much water accumulates in the water reservoir 50, excess water will flow through the slot 52 into the surrounding top soil.

Figure 11:
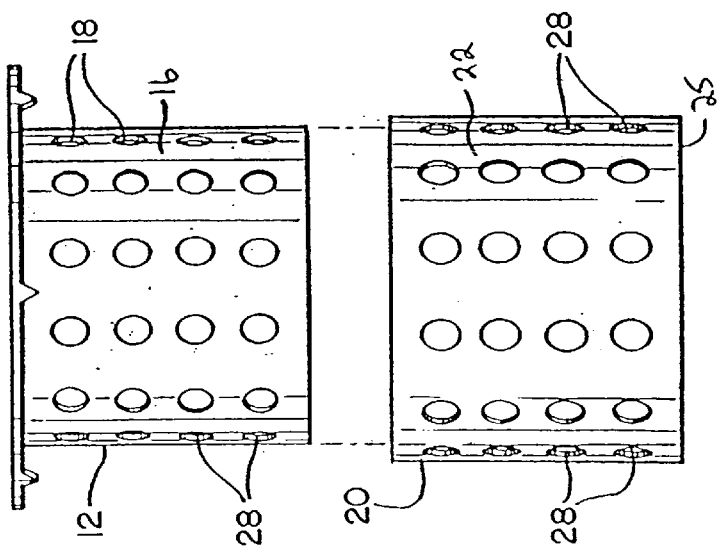
FIG. 11 illustrates another embodiment of the present invention.

Another embodiment of the present invention is illustrated in FIG. 11. In this embodiment, the wall 16 of the inner container 12 and the wall 22 of the outer container 20 each have a plurality of openings or holes. The holes 18 of the wall 16 of the inner container 12 are designed to align with the holes 28 of the wall 22 of the outer container 20. Once the holes 18, 28 are aligned, water may travel directly from the surrounding top soil into the flowers or plants which are planted into the inner container 12. In addition, once the holes 18, 28 are aligned, the roots of the flowers or plants planted into the inner container 12 may grow through the holes 18, 28 into the surrounding top soil. If the holes 18, 28 are not aligned, water may flow through the holes 28 of the outer container 20 to the wall 16 of the inner container 12 where there is no hole 18. Instead of flowing through the holes 18, 28 into the flower or plant, water will tend to flow downward (due to gravity) between the inner container 12 and the outer container 20 and into the soil beneath the containers since the outer container 20 is open at its bottom.

Figure 12A:
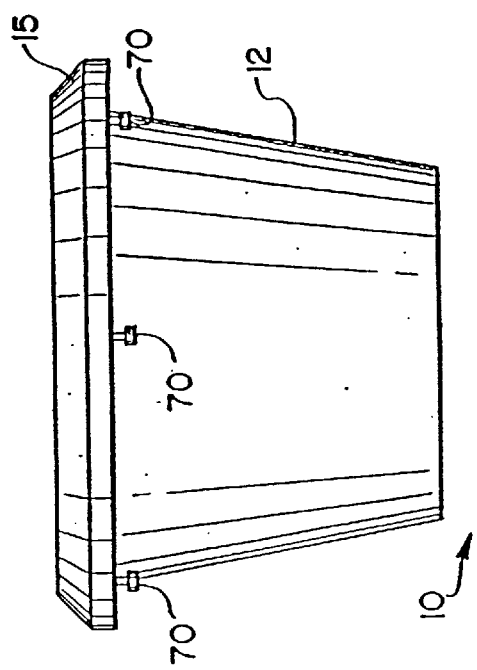
FIGS. 12A and 12B illustrate another embodiment of the present invention.
Figure 12B:
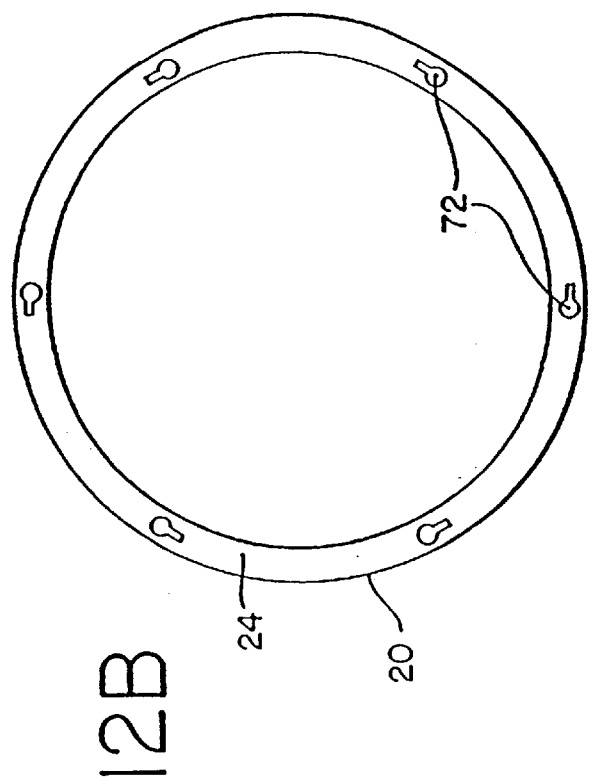

In a preferred embodiment, the inner container 12 is removably secured to the outer container 20. In this embodiment, the lip 15 snap fits onto the top edge of the outer container 20. In another embodiment, which is illustrated in FIGS. 12A and 12B, protrusions 70 which protrude downward from the top edge 14 or the lip 15 of the inner container 12 fit into key hole slots 72 formed into the top edge 24 of the outer container 20. The protrusions 70 are placed into the key hole slots 72 and the inner container is twisted to interlock the inner container 12 to the outer container 20.

Figure 13:
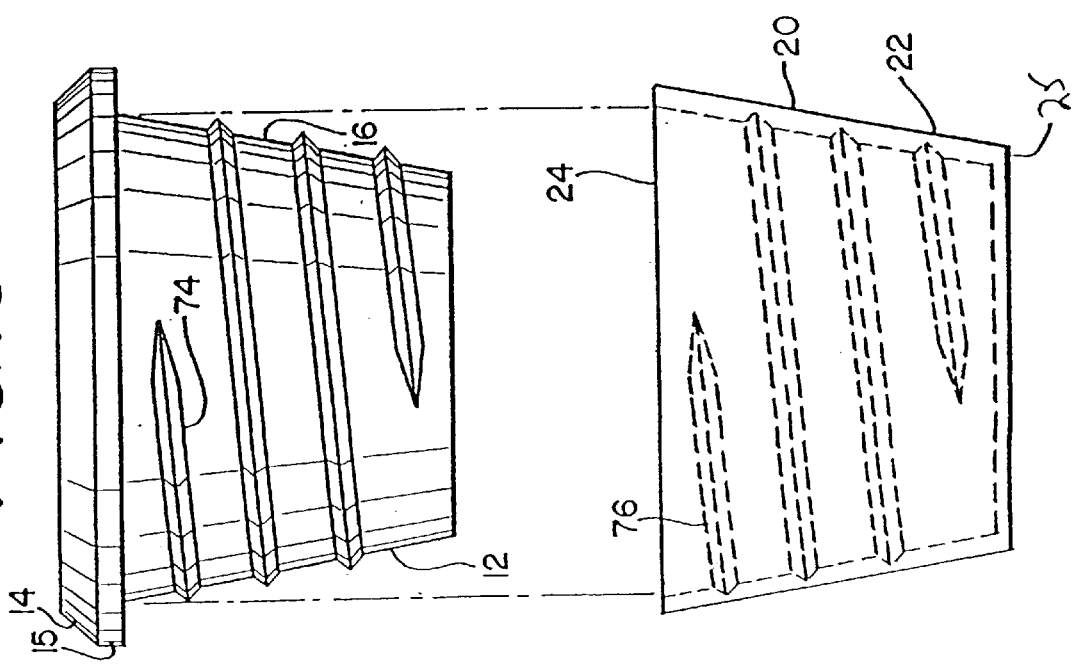
FIG. 13 illustrates another embodiment of the present invention.

In another embodiment, the inner container 12 is threadably secured to the outer container 20. Generally, threads formed on one container intermesh with grooves formed on the other container. More particularly, in one embodiment, as shown in FIG. 13, threads 74 which are formed on the outer surface of the wall 16 of the inner container 12 intermesh with complementary grooves 76 formed on the inner surface of the wall 22 of the outer container 20. In the alternative (not shown), the threads are formed on the inner surface of the wall of the outer container and the complementary grooves are formed on the outer surface of the wall of the inner container. In use, again, the threads intermesh with the grooves to threadably secure the inner container to the outer container.

Additionally, the threads and the complementary grooves may be formed on the inner container and the outer container to allow the gardener to turn the inner container in both a clockwise direction and a counterclockwise direction when placing the inner container into the outer container. Thus, in one embodiment, as shown in FIG. 13, the threads 74 and the complementary grooves 76 are formed, respectively, on the inner container 12 and outer container 20 such that the inner container 12 may be threadably secured to the outer container 20 by turning the inner container 12 in a clockwise direction when placing the inner container 12 into the outer container 20. In the alternative (not shown), the threads and grooves are formed in the reverse direction such that the inner container is turned in a counterclockwise direction to threadably secure the inner container to the outer container. Similarly, if the threads are formed on the outer container and the complementary grooves are formed on the inner container, the threads and grooves may be formed such that the inner container may be threadably secured to the outer container by turning the inner container in either a clockwise or counterclockwise direction when placing the inner container into the outer container.

Figure 14:
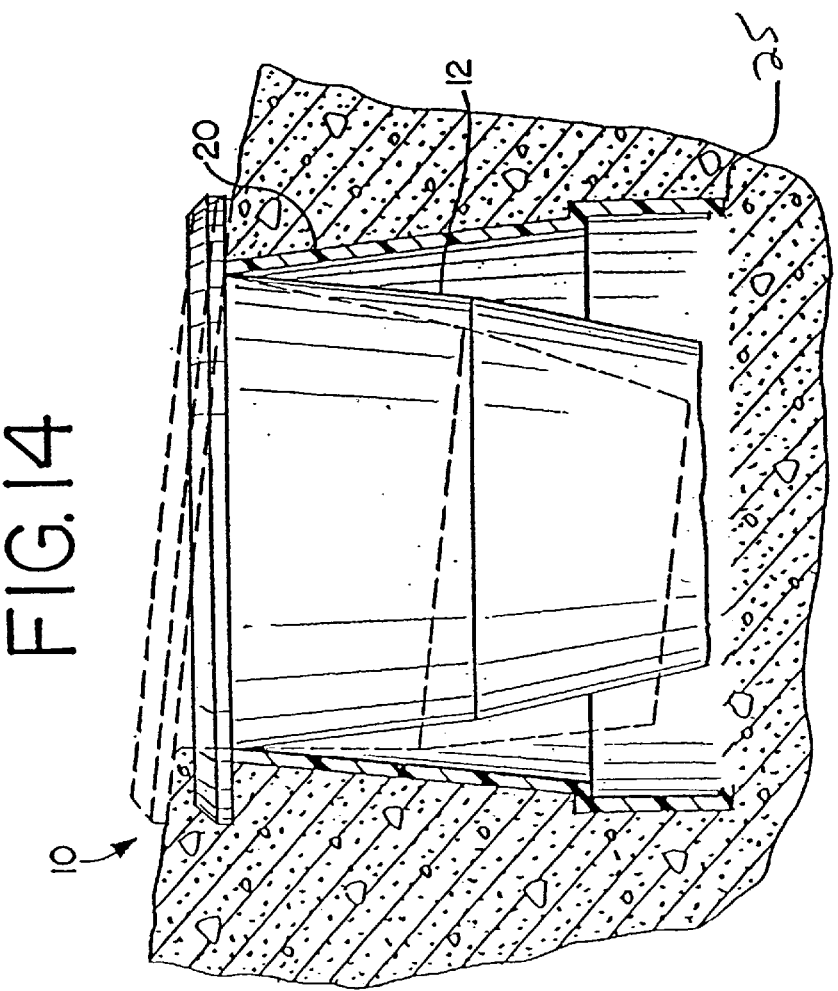
FIG. 14 illustrates the present invention being used in uneven terrain.

As illustrated in FIG. 14, the inner container 12 may be placed in different positions within the outer container 20. In one embodiment, the inner container 12 is placed into the outer container 20 such that the top edge 14, or the lip 15, of the inner container 12 is flush with the contour of the ground. The outer container 20 may be placed into the ground in a variety of positions, including having the top edge 24 of the outer container 20 flush with the ground or having a section of the top edge 24 below the contour of the ground. Because the lip 15 of the inner container 12 is flattened out to form a flange, the lip 15 will rest on the top edge 24 of the outer container 20.

Figure 15:
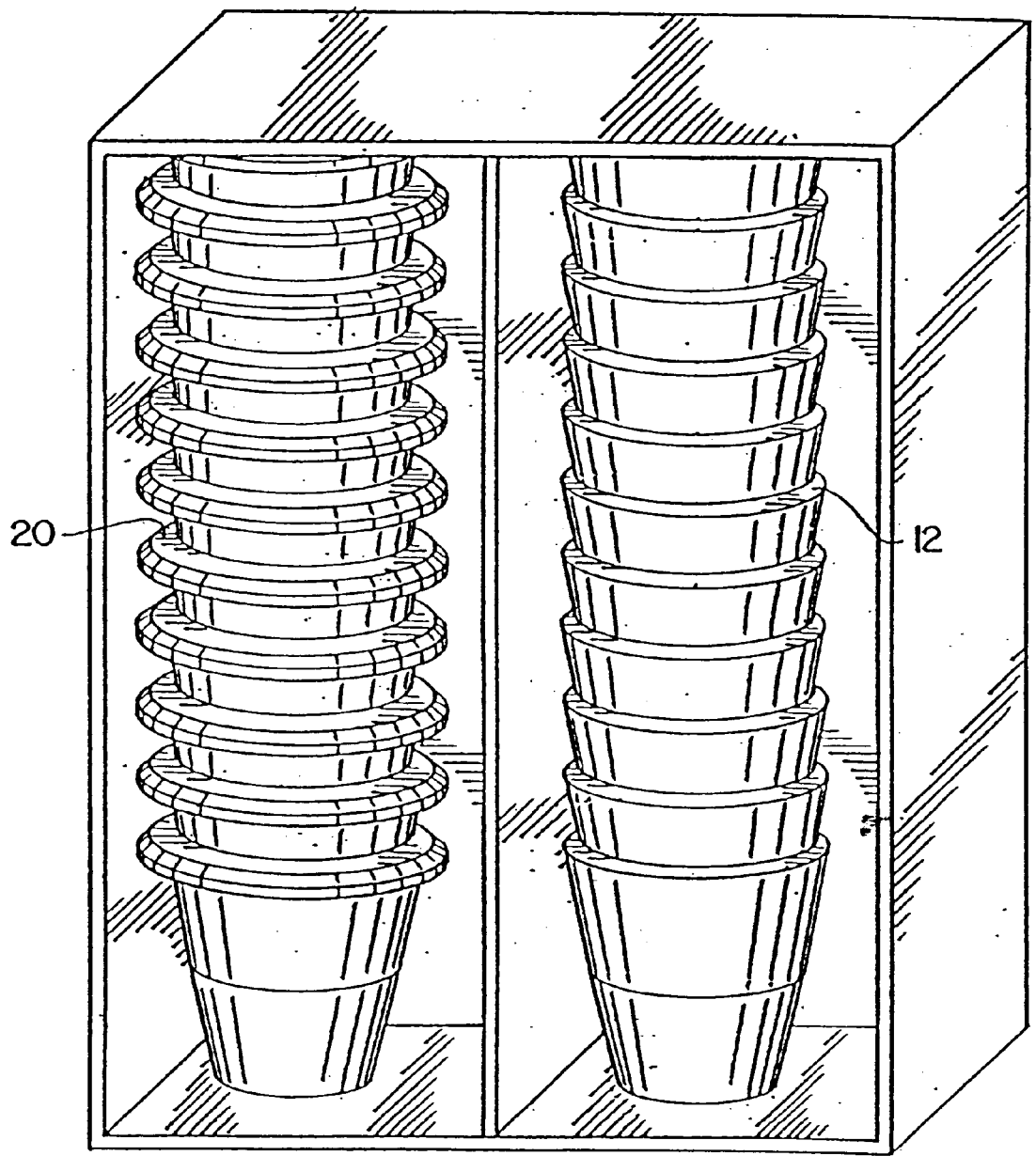
FIG. 15 illustrates how the inner and outer containers of the present invention can be nested during transport or for storage.

FIG. 15 illustrates the stackable nature of the inner containers and outer containers. In one embodiment, a plurality of inner containers are all the same shape and size, and are tapered, i.e., they decrease in diameter from one end to the other. Thus, the plurality of inner containers can be nested in the vertical direction for easy storage and transport. Similarly, a plurality of outer containers may be stacked in the vertical direction for easy storage and transport.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. An in-ground planting system comprising:
   an outer container, including a side wall, adapted to be placed in the ground;
   an inner container adapted to be removably placed into said outer container, including a side wall and a bottom wall; and
   a capillary unit positioned at the bottom of said inner container, with a reservoir for holding water being formed by said bottom wall and said side wall of said inner container, and said capillary unit comprising an upper portion and a plurality of protrusions protruding downward from said upper portion to contact said bottom wall of said inner container;
   wherein flowers, plants, bushes, trees or the like are planted into said inner container.

2. The planting system of claim 1 wherein said outer container and said inner container are both cylindrically shaped.

3. The planting system of claim 1 wherein:
   said outer container is generally frustoconically shaped, wherein the diameter of said outer container generally increases from top to bottom; and
   said inner container is generally frustoconically shaped, wherein the diameter of said inner container generally increases from bottom to top.

4. The planting system of claim 1 further comprising an anchoring apparatus, wherein said anchoring apparatus comprises:
   a plurality of anchors; and
   said side wall of said outer container includes a plurality of openings formed therethrough;
   wherein said anchors are inserted through said openings to anchor said outer container into the ground.

5. An in-ground planting system for planting flowers, plants, bushes, trees and the like comprised of:
   an outer container adapted to be placed in the ground, said outer container having a predetermined shape and including at least one side wall;
   an inner container having a shape complementary to the predetermined shape of the outer container and adapted to be removably placed into said outer container, including a bottom wall and at least one side wall;
   a capillary unit positioned at the bottom of said inner container, with a reservoir for holding water being formed by said bottom wall and said at least one side wall of said inner container, and said capillary unit comprising an upper portion and a plurality of protrusions protruding downward from said upper portion to contact said bottom wall of said inner container; and
   a plurality of anchors;
   said side wall of said outer container including a plurality of openings formed therethrough, wherein said anchors are inserted through said openings to anchor said outer container into the ground; and
   wherein flowers, plants, bushes or trees are planted into said inner container.

6. The planting system of claim 5 wherein said shapes of said inner container and said outer container are such that their cross-sectional shapes are circular, rectangular, triangular or square.

7. The planting system of claim 5 further comprising:
   a capillary unit positioned at the bottom of said inner container.

8. An in-ground planting system comprising:
   an outer container, including a side wall, adapted to be placed in the ground;
   an inner container adapted to be removably placed into said outer container, including a side wall and a bottom wall;
   said side wall of said inner container including a plurality of first openings formed therethrough;
   said side wall of said outer container including a plurality of second openings formed therethrough;
   wherein said first openings can be aligned with said second openings; and
   a capillary unit positioned at the bottom of said inner container, with a reservoir for holding water being formed by said bottom wall and said side wall of said inner container;
   wherein flowers, plants, bushes, trees or the like are planted into said inner container.

9. The planting system of claim 1 or 5 wherein said inner container is removably secured to said outer container.

10. The planting system of claim 8 wherein:
    said inner container includes a top edge, a plurality of protrusions extending downwards from said top edge of said inner container; and
    said outer container includes a top edge, said top edge of said outer container includes a plurality of key hole slots formed there through;

wherein said inner container is aligned with said outer container such that said protrusions fit into said key hole slots to secure said inner container to said outer container.

11. The planting system of claim 9 wherein:
said inner container includes a top edge which is flanged to form a lip; and
said outer container includes a top edge;
wherein said lip snap fits onto said top edge of said outer container to secure said inner container to said outer container.

12. The planting system of claim 9 wherein said inner container is threadably secured to said outer container wherein:
said inner container includes threads formed on the exterior of said side wall of said inner container; and
said outer container includes complementary grooves formed on the interior of said side wall of said outer container;
wherein said threads intermesh with said complementary grooves to threadably secure said inner container to said outer container.

13. The planting system of claim 12 wherein said inner container is turned in a clockwise direction when being placed into said outer container to threadably secure said inner container to said outer container.

14. The planting system of claim 12 wherein said inner container is turned in a counterclockwise direction when being placed into said outer container to threadably secure said inner container to said outer container.

15. The planting system of claim 4 wherein said inner container is threadably secured to said outer container wherein:
said outer container includes threads formed on the interior of said side wall of said outer container; and
said inner container includes complementary grooves formed on the exterior of said side wall of said inner container;
wherein said threads intermesh with said complementary grooves to threadably secure said inner container to said outer container.

16. The planting system of claim 15 wherein said inner container is turned in a clockwise direction when being placed into said outer container to threadably secure said inner container to said outer container.

17. The planting system of claim 15 wherein said inner container is turned in a counterclockwise direction when being placed into said outer container to threadably secure said inner container to said outer container.

18. A planting system for planting flowers, plants, bushes, trees and the like comprised of:
an outer container, said outer container having a predetermined shape and including at least one side wall;
an inner container having a shape complementary to the predetermined shape of the outer container and adapted to be removably placed into said outer container, including a bottom wall and at least one side wall;
a plurality of anchors;
said side wall of said outer container including a plurality of openings formed therethrough, wherein said anchors are inserted through said openings to anchor said outer container into the ground;
a capillary unit positioned at the bottom of said inner container, wherein said capillary unit comprises:
an upper portion, said upper portion having a cross-sectional shape which is complementary to said inner container, said upper portion including a plurality of first openings formed therethrough; and
a plurality of protrusions protruding downward from said upper portion to contact said bottom wall of said inner container, said protrusions being hollow, and the bottom of said protrusions including second openings formed therethrough;
wherein flowers, plants, bushes or trees are planted into said inner container.

19. The planting system of claim 18 further comprising:
a reservoir for holding water formed by said bottom wall of said inner container and said side wall of said inner container, wherein said reservoir is formed by water flowing through said first openings; and
said side wall of said inner container including a third opening formed there through, said third opening being positioned below said upper portion and above said bottom wall of said inner container, said third opening being an overflow drain;
wherein water from said reservoir may flow through said second openings in said protrusions to the plants, flower, bushes or trees planted in said inner container; and
wherein water may flow from said reservoir through said overflow drain into the ground.

20. A planting system comprising:
a plurality of outer containers to be placed into the ground, each of said outer containers including a side wall, each being generally frustoconically shaped, wherein the diameter of each of said outer containers generally increases from top to bottom;
a plurality of inner containers, each of said inner containers adapted to be removably placed into any of said plurality of outer containers, each of said inner containers including a side wall and a bottom wall, each being generally frustoconically shaped, wherein the diameter of each of said inner containers generally increases from bottom to top; and
a capillary unit positioned at the bottom of each said inner container, with a reservoir for holding water being formed by said bottom wall and said side wall of said inner container, and said capillary unit comprising an upper portion and a plurality of protrusions protruding downward from said upper portion to contact said bottom wall of said inner container;
wherein flowers, plants, bushes, trees or the like are planted into each of said plurality of inner containers so that when desired any of said plurality of inner containers may be removed from any of said plurality of outer containers and replaced by another of said plurality of inner containers.

21. The planting system of claim 20 wherein:
said removed inner container is placed into another of said plurality of outer containers.

22. A method for planting comprising of the steps of:
placing an outer container having a side wall into the ground; planting flowers, plants, bushes or trees into an inner container having a side wall and a bottom wall;
placing said inner container into said outer container;
providing a capillary unit positioned at the bottom of said inner container, with a reservoir for holding water being formed by said bottom wall and said side wall of said inner container, and said capillary unit comprising an upper portion and a plurality of protrusions protruding downward from said upper portion to contact said bottom wall of said inner container; and anchoring said outer container into the ground, wherein said side wall of said outer container includes openings formed therethrough, by inserting anchors through said openings for said anchoring.

23. A method for planting comprising of the steps of:

removing soil from the ground to form a hole in the ground;

positioning into the hole an outer container having a side wall, a top edge and a bottom edge, wherein the cross-sectional area of said outer container at said bottom edge is greater than the cross-sectional area of said outer container at said top edge, wherein said outer container is positioned such that said top edge of said outer container is generally flush with the ground;

replacing soil along the outside of said side wall of said outer container;

planting flowers, plants, bushes or trees into an inner container having a side wall and a bottom wall;

wherein there is provided a capillary unit positioned at the bottom of said inner container, with a reservoir for holding water being formed by said bottom wall and said side wall of said inner container, and said capillary unit comprising an upper portion and a plurality of protrusions protruding downward from said upper portion to contact said bottom wall of said inner container; and removably placing said inner container into said outer container.

24. The method for planting of claim 23 further comprising the step of anchoring said outer container into the ground, wherein said side wall of said outer container includes openings formed there through, by inserting anchors through said openings for said anchoring.

25. The method for planting of claim 23 further comprising the step of placing soil into said outer container near said bottom edge of said outer container before removably placing said inner container into said outer container.

26. A method of planting comprising the steps of:

placing a plurality of outer containers into the ground, each of said outer containers having a top edge and a bottom edge, wherein, for each of said outer containers, the cross-sectional area of the outer container at its bottom edge is greater than the cross-sectional area of the outer container at its top edge;

planting flowers, plants, bushes, trees or the like into each of a plurality of inner containers having a side wall and a bottom wall;

providing a capillary unit positioned at the bottom of each said inner container, with a reservoir for holding water being formed by said bottom wall and said side wall of said inner container, and said capillary unit comprising an upper portion and a plurality of protrusions protruding downward from said upper portion to contact said bottom wall of said inner container;

placing a first inner container into a first outer container;

removing said first inner container from said first outer container; and placing a second inner container into said first outer container.

27. The method of planting of claim 26 further comprising the step of:

placing said first inner container into a second outer container.

28. The method of planting of claim 27 further comprising the steps of:

planting flowers, plants, bushes, trees or the like into a third inner container;

removing said first inner container from said second outer container; and placing said third inner container into said second outer container.

29. The method of planting of claim 26 further comprising the steps of:

planting flowers, plants, bushes, trees or the like into a fourth inner container;

removing said second inner container from said first outer container; and placing said fourth inner container into said first outer container.

30. A method of planting comprising the steps of:

placing at least one outer container into the ground, said outer container having a top edge and a bottom edge, wherein the cross-sectional area of said outer container at said bottom edge is greater than the cross-sectional area of said outer container at said top edge, thereby maintaining said outer container in position in the ground by the weight of soil on said outer container;

planting flowers, plants, bushes, trees or the like into a first inner container having a side wall and a bottom wall;

providing a capillary unit positioned at the bottom of said inner container, with a reservoir for holding water being formed by said bottom wall and said side wall of said inner container, and said capillary unit comprising an upper portion and a plurality of protrusions protruding downward from said upper portion to contact said bottom wall of said inner container;

placing said first inner container into a first outer container;

planting flowers, plants, bushes, trees or the like into a second inner container having a side wall and a bottom wall;

removing said first inner container from said first outer container; and placing said second inner container into said first outer container.

31. An in-ground planting system for planting flowers, plants, bushes, trees and the like comprised of:

an outer container adapted to be placed in the ground, said outer container having predetermined shape and including at least one side wall;

an inner container having a shape complementary to the predetermined shape of the outer container and adapted to be removably placed into said outer container, including a bottom wall and at least one side wall;

said at least one side wall of said inner container includes a plurality of first openings formed therethrough;

said at least one side wall of said outer container includes a plurality of second openings formed therethrough;

wherein said first openings can be aligned with said second openings;

a plurality of anchors;

said side wall of said outer container including a plurality of openings formed therethrough, wherein said anchors are inserted through said openings to anchor said outer container into the ground; and wherein flowers, plants, bushes, trees or the like are planted into said inner container.

* * * * *